United States Patent
Miyazawa et al.

(10) Patent No.: US 11,671,624 B2
(45) Date of Patent: Jun. 6, 2023

(54) EVALUATION APPARATUS, EVALUATION METHOD AND PROGRAM

(71) Applicant: NIPPON TELEGRAPH AND TELEPHONE CORPORATION, Tokyo (JP)

(72) Inventors: Takehito Miyazawa, Musashino (JP); Yukihiro Bando, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/294,956

(22) PCT Filed: Nov. 13, 2019

(86) PCT No.: PCT/JP2019/044458
§ 371 (c)(1),
(2) Date: May 18, 2021

(87) PCT Pub. No.: WO2020/105520
PCT Pub. Date: May 28, 2020

(65) Prior Publication Data
US 2022/0021903 A1     Jan. 20, 2022

(30) Foreign Application Priority Data
Nov. 21, 2018   (JP) .............................. JP2018-218458

(51) Int. Cl.
*H04N 19/597*     (2014.01)
*H04N 19/182*     (2014.01)

(52) U.S. Cl.
CPC ......... *H04N 19/597* (2014.11); *H04N 19/182* (2014.11)

(58) Field of Classification Search
CPC ........................... H04N 19/597; H04N 19/182
See application file for complete search history.

(56) References Cited

U.S. PATENT DOCUMENTS 10,440,367 B1 * 10/2019 Choi ...................... H04N 21/24
11,006,161 B1 *  5/2021 Ducloux .......... H04N 21/23439
(Continued)

FOREIGN PATENT DOCUMENTS

CN     102999911 A  * 11/2012
CN     102999911 A  *  3/2013
(Continued)

OTHER PUBLICATIONS

Munekazu Date et al., Real-time viewpoint image synthesis using strips of multi-camera images, 2015 SPIE-IS&T, Mar. 17, 2015.
(Continued)

*Primary Examiner* — Zaihan Jiang
(74) *Attorney, Agent, or Firm* — Harness, Dickey & Pierce, P.L.C.

(57) ABSTRACT

An evaluation device for evaluating coding quality of coded data of an image for a first viewpoint in a multi-viewpoint image, the evaluation device includes an evaluation unit that evaluates coding quality of coded data relating to the first viewpoint by associating a pixel value of an original image for the first viewpoint, a pixel value obtained from the coded data relating to the first viewpoint, a pixel value of an original image for a second viewpoint that is different from the first viewpoint and a pixel value obtained from coded data relating to the second viewpoint with one another.

9 Claims, 6 Drawing Sheets

(56) References Cited

U.S. PATENT DOCUMENTS

| | | | | |
|---|---|---|---|---|
| 2017/0300318 | A1* | 10/2017 | Goniwada | G06F 16/285 |
| 2017/0359582 | A1* | 12/2017 | Kawano | H04N 19/124 |
| 2018/0302648 | A1* | 10/2018 | Jung | H04N 19/105 |
| 2019/0108859 | A1* | 4/2019 | Krishnan | H04N 21/4728 |
| 2019/0230384 | A1* | 7/2019 | Lee | H04N 19/117 |
| 2019/0281318 | A1* | 9/2019 | Han | H04N 19/174 |
| 2019/0320186 | A1* | 10/2019 | Liu | H04N 19/597 |
| 2019/0379895 | A1* | 12/2019 | Katsavounidis | H04N 19/103 |
| 2019/0392266 | A1* | 12/2019 | Zhong | G06V 30/19173 |
| 2020/0068235 | A1* | 2/2020 | Han | H04N 21/222 |
| 2021/0211768 | A1* | 7/2021 | Zhong | G10L 25/57 |

FOREIGN PATENT DOCUMENTS

| | | | | |
|---|---|---|---|---|
| JP | 2011199382 | A | * | 3/2010 |
| JP | 2011199382 | A | * | 10/2010 |
| JP | 2013236134 | A | * | 5/2012 |
| JP | 2013236134 | A | * | 11/2013 |

OTHER PUBLICATIONS

Munekazu Date et al., Visually equivalent light field flat panel 3D display, Proceedings of the 22nd Annual Meeting of the Virtual Reality Society of Japan, Sep. 2017.

* cited by examiner

EVALUATION APPARATUS, EVALUATION METHOD AND PROGRAM

CROSS-REFERENCE TO RELATED APPLICATIONS

This application is a 371 U.S. National Phase of International Application No. PCT/JP2019/044458 filed on Nov. 13, 2019, which claims priority to Japanese Application No. 2018-218458 filed on Nov. 21, 2018. The entire disclosures of the above applications are incorporated herein by reference.

TECHNICAL FIELD

The present invention relates to an evaluation device, an evaluation method and a program.

BACKGROUND ART

In order to provide a high level of realism, representation of smooth motion parallax is important. As a method for representation of motion parallax, there is multi-view display, which, however, involves switching of viewing spaces. In super multi-view display or high-density directional display with an enhanced directional density of multi-view display, motion parallax is smoothed; however, in order to represent continuous motion parallax, a large number of images are required. Therefore, a display technique that represents continuous motion parallax with a small number of images by linearly blending a plurality of images has been proposed. Linear blending is a technique that generates an image for a viewpoint located between adjacent two cameras (hereinafter referred to as "intermediate viewpoint") by performing linear interpolation of two images respectively picked up by the two cameras (for example, Non-Patent Literature 1). A display that provides glasses-free 3D (three-dimensional) display using the linear blending is called a linear blending display (for example, Non-Patent Literature 2). The linear blending display can display different light rays depending on the viewpoint directions. The linear blending display generates images corresponding to intermediate viewpoints from a multi-viewpoint image picked up by a camera array and outputs images according to positions of viewpoints. Consequently, a viewer can view an image corresponding to a position of a viewpoint that changes along with movement, enabling provision of a stereoscopic effect. Hereinafter, a multi-viewpoint image inputted to a linear blending display is referred to as "input viewpoint image" and an image generated from the input viewpoint image by means of linear blending is referred to as "intermediate viewpoint image".

In coding and decoding of image data according to an irreversible compression method, a difference in pixel value (coding distortion) occurs between an original image and a decoded image. In general, a large distortion amount of coding distortion affects a subjective image quality, and thus, a coding mode is selected so as to decrease both a distortion amount and a coding amount. Conventionally, as an evaluation index representing the distortion amount, a square error between pixel values of the original image and pixel values of the decoded image is used. The square error SE is represented by Formula (1) below.

[Math. 1]

$$SE = \sum_{x=0}^{W-1} \sum_{y=0}^{H-1} d(x, y)^2 \qquad (1)$$

Here, W and H represent the number of pixels in a horizontal direction and the number of pixels in a vertical direction in a coding target block, respectively. Also, $d(x, y)$ is a difference value between a pixel value of the original image and a pixel value of the decoded image in a pixel of coordinates $(x, y)$ in the coding target block. In general coding mode selection, a coding mode is selected so as to minimize a cost function that adds up the square error SE and an estimated coding amount at a constant ratio.

CITATION LIST

Non-Patent Literature

Non-Patent Literature 1: M. Date et al., "Real-time viewpoint image synthesis using strips of multi-camera images," Proc. of SPIE-IS&T, Vol. 9391 939109-7, 17 Mar. 2015.

Non-Patent Literature 2: Munekazu Date, et al., "Flat Panel Visually-equivalent Light Field 3D Display," 22nd Conference Proceedings of the Virtual Reality Society of Japan, 1B4-04, September 2017

SUMMARY OF THE INVENTION

Technical Problem

In the aforementioned evaluation of distortion amount in coding distortion, independent evaluation is performed for each viewpoint. However, if independent evaluation of a distortion amount in an image displayed on a linear blending display is performed for each viewpoint, amounts of distortion in generated intermediate viewpoint images may fail to be correctly taken into consideration. This point will be described below with a specific example.

FIGS. 6 and 7 each include diagrams for describing a coding distortion in an intermediate viewpoint image due to linear blending. FIGS. 6(A) and 6(B) illustrate two cases of respective distortion amounts in images for viewpoint A and viewpoint B, which are mutually adjacent viewpoints, and a distortion amount in an image for an intermediate viewpoint between viewpoint A and viewpoint B, as examples. Note that the intermediate viewpoint is an arbitrary viewpoint included in an aggregate of viewpoints located between the two viewpoints. In FIG. 6, a black circle represents a pixel value of an original image and a white circle represents a pixel value of a decoded image. Also, an arrow extending from a pixel value of an original image to a pixel value of a decoded image represents a difference between the pixel values. Also, $d(x, y)$ represents a difference value at coordinates $(x, y)$ in the image for viewpoint A and $d\char`^(x, y)$ represents a difference value at coordinates $(x, y)$ in the image for viewpoint B.

As illustrated in FIG. 6, the difference value $d(x, y)$ between the original image and the decoded image for viewpoint A is equal between case 1 (FIG. 6(A)) and case 2 (FIG. 6(B)). Also, the difference value $d\char`^(x, y)$ between the original image and the decoded image for viewpoint B is different in sign but is equal in absolute value between case 1 and case 2. Therefore, where a square error is calculated for each of the viewpoints according to the conventional evaluation method, an evaluation value is the same between case 1 and case 2 and a selected coding mode is also the same between case 1 and case 2. However, from two perspectives described below, respective coding distortions in case 1 and case 2 should be evaluated distinctively from each other.

First, coding distortion evaluation will be considered from the perspective of outputting an image close to an original image, where a viewpoint is fixed at a particular intermediate viewpoint between viewpoint A and viewpoint B. An image for the fixed intermediate viewpoint is one resulting from the image for viewpoint A and the image for viewpoint B being linearly blended. Therefore, a distortion amount of coding distortion varies depending on the position of the intermediate viewpoint. As illustrated in FIG. 6(A), in case 1, a relationship in magnitude between the pixel value of the original image and the pixel value of the decoded image is reversed between viewpoint A and viewpoint B. Consequently, the distortion amount of coding distortion in the intermediate viewpoint image becomes small in comparison with the distortion amount in viewpoint A and distortion amount in viewpoint B. On the other hand, as illustrated in FIG. 6(B), in case 2, a relationship in magnitude between the pixel value of the original image and the pixel value of the decoded image is not reversed between viewpoint A and viewpoint B. Consequently, the distortion amount of coding distortion in the intermediate viewpoint image becomes a distortion amount that is intermediate between the distortion amount in viewpoint A and the distortion amount in viewpoint B. Therefore, of case 1 and case 2, the distortion amount of coding distortion in the intermediate viewpoint image is smaller in case 1. When a viewer views a linear blending display from an arbitrary position, intermediate viewpoint images that are successively present are often viewed rather than input viewpoint images that are discretely present. Therefore, from the perspective of outputting an image close to an original image, it is desirable that a coding mode in which a coding distortion evaluation value according to case 1 is outputted be preferentially selected.

Next, coding distortion evaluation will be considered from the perspective of causing change in pixel value to be displayed in an originally intended manner where a viewpoint of a viewer moves from viewpoint A toward viewpoint B. As illustrated in FIG. 7, two cases where a distortion amount of coding distortion in viewpoint A and the distortion amount of coding distortion in viewpoint B are distortion amounts that are similar to those in FIG. 6 will be considered. As illustrated in FIG. 7, where a transition in pixel value from an image for viewpoint A to an image for viewpoint B is considered, in an original image, the pixel value increases in both of case 1 and case 2. On the other hand, in a decoded image, in case 2, as in the original image, the pixel value increases but in case 1, the pixel value decreases. Therefore, from the perspective of change in pixel value, where a viewpoint is moved, being displayed in an originally intended manner, that is, in a manner that is similar to that of a case where no coding is performed, it is desirable that a coding mode in which an evaluation value of coding distortion according to case 2 is outputted be preferentially selected. Note that display in a manner that is similar to that of a case where no coding is performed is display that is substantially similar to display in a case where an image for an intermediate viewpoint is generated using original images.

According to the above, where intermediate viewpoint images being close to original images is prioritized, it is desirable to select the coding mode corresponding to case 1, and where change in pixel value at the time of movement of a viewpoint being displayed in an originally intended manner is prioritized, it is desirable to select the coding mode corresponding to case 2. Note that in reality, a coding mode should be determined according to a viewing style or a content, with a balance between case 1 and case 2 taken into consideration. In cases, e.g., where a viewpoint of a viewer is fixed to some extent, for example, like in a movie theater or the like, and where change in angle of a line of sight at the time of movement is small because of a long viewing distance, it is desirable that the coding mode corresponding to case 1 be preferentially selected, and in cases, e.g., where a viewer constantly moves around and where change in angle of a line of sight at the time of movement is large because of a short viewing distance, it is desirable that the coding mode corresponding to case 2 be preferentially selected.

However, in the conventional evaluation method in which independent coding distortion evaluation based on a square error is performed for each viewpoint, as stated above, an evaluation value of the coding distortion in case 1 and an evaluation value of the coding distortion in case 2 become the same and cannot be distinguished from each other. Therefore, if the conventional evaluation method is used for an input viewpoint image, the coding mode corresponding to the case 1 or case 2 cannot preferentially be selected at the time of coding, causing the problem of a failure to maximize subjective image quality.

The present invention has been made in view of such circumstances and an object of the present invention is to provide a technique that enables enhancement in subjective image quality of an entirety of an image, that is, input viewpoint images and intermediate viewpoint images, displayed on a linear blending display.

Means for Solving the Problem

An aspect of the present invention provides an evaluation device for evaluating coding quality of coded data of an image for a first viewpoint in a multi-viewpoint image, the evaluation device including an evaluation unit that evaluates coding quality of coded data relating to the first viewpoint by associating a pixel value of an original image for the first viewpoint, a pixel value obtained from the coded data relating to the first viewpoint, a pixel value of an original image for a second viewpoint that is different from the first viewpoint and a pixel value obtained from coded data relating to the second viewpoint with one another.

Also, an aspect of the present invention provides the above evaluation device in which the evaluation unit reflects evaluation relating to a third viewpoint that is different from the first viewpoint and the second viewpoint and is not included in images included in the multi-viewpoint image, in the evaluation of the coding quality of the coded data relating to the first viewpoint, by using the pixel value of the original image for the second viewpoint and the pixel value obtained from the coded data relating to the second viewpoint.

Also, an aspect of the present invention provides the above evaluation device in which: the third viewpoint is an arbitrary viewpoint included in an aggregate of viewpoints located between the first viewpoint and the second viewpoint; and the evaluation unit evaluates coding quality of the coded data relating to the first viewpoint, using a difference value between a pixel value of an image for the third viewpoint based on the original image for the first viewpoint and the original image for the second viewpoint and a pixel value of an image for the third viewpoint based on the pixel value obtained from the coded data relating to the first viewpoint and the pixel value obtained from the coded data relating to the second viewpoint.

Also, an aspect of the present invention provides the above evaluation device in which: the third viewpoint is an arbitrary viewpoint included in an aggregate of viewpoints located between the first viewpoint and the second viewpoint; and the evaluation unit evaluates coding quality of the coded data relating to the first viewpoint, using amounts of change of at least two pixel values of the pixel value of the original image for the first viewpoint, the pixel value of the original image for the second viewpoint, and a pixel value of an image for the third viewpoint that is based on the original image for the first viewpoint and the original image for the second viewpoint and amounts of change of at least two pixel values of the pixel value obtained from the coded data relating to the first viewpoint, the pixel value obtained from the coded data relating to the second viewpoint, and a pixel value of an image for the third viewpoint, the pixel value being obtained based on the pixel value obtained from the coded data relating to the first viewpoint and the pixel value obtained from the coded data relating to the second viewpoint.

Also, an aspect of the present invention provides the above evaluation device in which the evaluation unit evaluates coding quality of the coded data relating to the first viewpoint, using an amount of difference between the pixel values of the images for the third viewpoint.

Also, an aspect of the present invention provides the above evaluation device in which the evaluation unit evaluates coding quality of the coded data relating to the first viewpoint, using a value of $SE_{LBD}$ calculated according to the following evaluation formula.

[Math. 2]

$$SE_{LBD} = \sum_{x=0}^{W-1}\sum_{y=0}^{H-1}\left(d(x, y)^2 + \Lambda d(x, y)\hat{d}(x, y) + \hat{d}(x, y)^2\right)$$

where $\Lambda \in [-2, 1]$

Here, W and H represent a number of pixels in a horizontal direction and a number of pixels in a vertical direction in the original image for the first viewpoint, respectively. Also, $d(x, y)$ represents a difference value between a pixel value of coordinates (x, Y) in the original image for the first viewpoint and a pixel value of coordinates (x, y) in a decoded image for the first viewpoint and $\hat{d}(x, y)$ represents a difference value between the pixel value of coordinates (x, y) in the original image for the second viewpoint and a pixel value of coordinates (x, y) in a decoded image for the second viewpoint.

Also, an aspect of the present invention provides an evaluation method for evaluating coding quality of coded data of an image for a first viewpoint in a multi-viewpoint image, the evaluation method including an evaluation step of evaluating coding quality of coded data relating to the first viewpoint by associating a pixel value of an original image for the first viewpoint, a pixel value obtained from the coded data relating to the first viewpoint, a pixel value of an original image for a second viewpoint that is different from the first viewpoint and a pixel value obtained from coded data relating to the second viewpoint with one another.

Also, an aspect of the present invention provides a program for causing a computer to function as the above evaluation device.

Effects of the Invention

The present invention enables enhancement in subjective image quality of an entirety of an image, that is, input viewpoint images and intermediate viewpoint images, displayed on a linear blending display.

DESCRIPTION OF EMBODIMENTS

Embodiment

An evaluation device, an evaluation method and a program according to an embodiment of the present invention will be described below with reference to the drawings. The below-described evaluation device, etc., are intended to evaluate a coding distortion in coding an input viewpoint image. The below-described evaluation device, etc., perform evaluation of a coding distortion of a coded image in consideration of not only the coded image but also a coding distortion at a viewpoint estimated using the coded image. A result of the evaluation can be used for evaluation of a multi-viewpoint video image itself and can also be used, for example, as an index for determining a coding parameter for coding the multi-viewpoint video image.

[Configuration of Evaluation Device]

Figure 1:
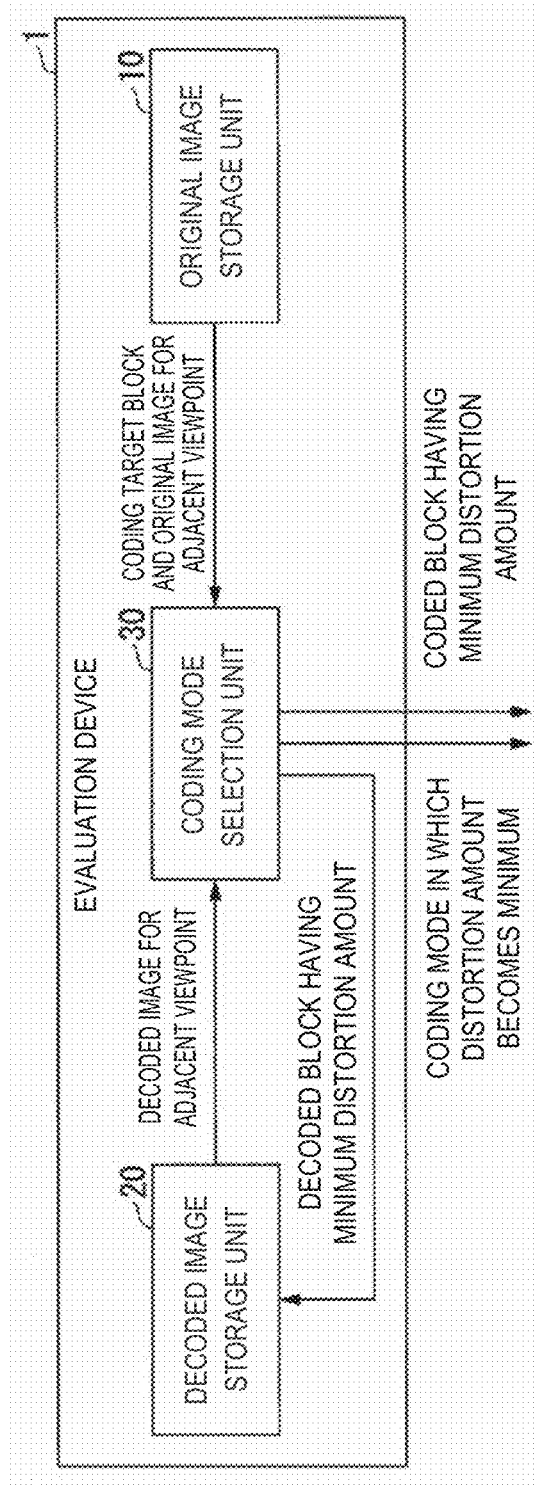
FIG. 1 is a block diagram illustrating a functional configuration of an evaluation device 1 according to an embodiment of the present invention.

FIG. 1 is a block diagram illustrating a functional configuration of an evaluation device 1 according to an embodiment of the present invention. As illustrated in FIG. 1, the evaluation device 1 includes an original image storage unit 10, a decoded image storage unit 20 and a coding mode selection unit 30. The evaluation device 1 is implemented, for example, as a part of an encoder.

The original image storage unit 10 stores original images to be coded. The decoded image storage unit 20 stores decoded images that are images resulting from coded original images being decoded. The original image storage unit 10 and the decoded image storage unit 20 are each provided by, for example, a flash memory, an HDD (hard disk drive), an SDD (solid state drive), a RAM (random access memory; readable and writable memory), a register or the like.

The coding mode selection unit 30 acquires information indicating a coding target block and an original image for an adjacent viewpoint from the original image storage unit 10. Also, the coding mode selection unit 30 acquires a decoded image for the adjacent viewpoint from the decoded image storage unit 20. The coding mode selection unit 30 calculates a distortion amount (change amount) of a coding distortion based on the information indicating the coding target block, the original image for the adjacent viewpoint and the decoded image for the adjacent viewpoint. The coding mode selection unit 30 selects a coding mode in which the distortion amount becomes minimum. Like in selection of a coding mode performed in H.265/HEVC (High Efficiency Video Coding), the coding mode selection unit 30 calculates an evaluation formula for a cost (distortion amount) each time a coding mode is determined.

The coding mode selection unit 30 performs coding and decoding of the coding target block in the selected coding mode to obtain a coded block and a decoded block. The coding mode selection unit 30 outputs information indicating the coding mode in which the distortion amount becomes minimum and the coded block in which the distortion amount becomes minimum to an external device. Also, the coding mode selection unit 30 stores the decoded block having a minimum distortion amount in the decoded image storage unit 20.

[Configuration of Coding Mode Selection Unit]

A configuration of the coding mode selection unit 30 will be described in further detail below.

Figure 2:
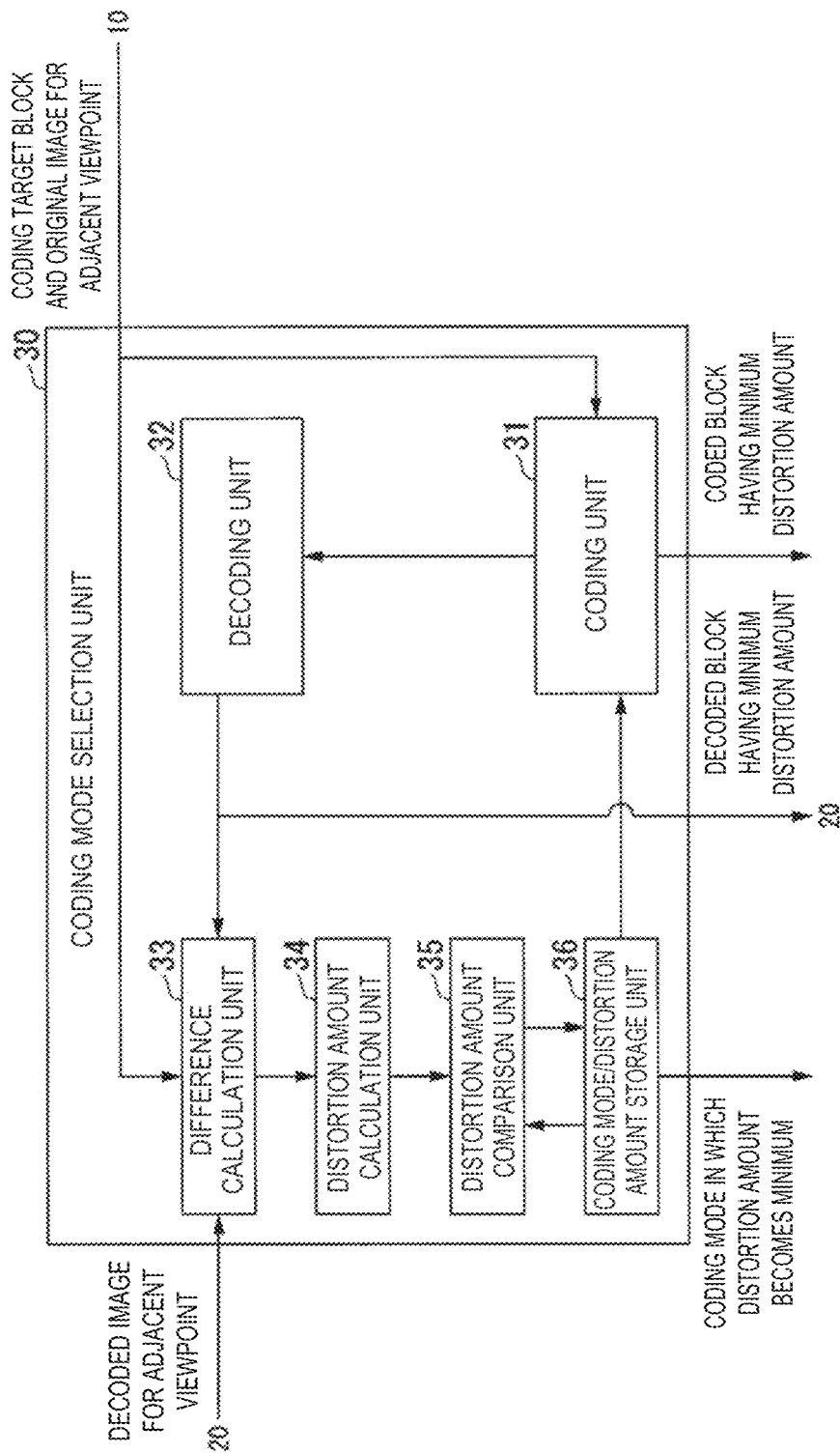
FIG. 2 is a block diagram illustrating a functional configuration of a coding mode selection unit 30 in the evaluation device 1 according to an embodiment of the present invention.

FIG. 2 is a block diagram illustrating a functional configuration of the coding mode selection unit 30 in the evaluation device 1 according to an embodiment of the present invention. As illustrated in FIG. 2, the coding mode selection unit 30 includes a coding unit 31, a decoding unit 32, a difference calculation unit 33, a distortion amount calculation unit 34, a distortion amount comparison unit 35 and a coding mode/distortion amount storage unit 36.

The coding unit 31 acquires information indicating a coding target block and an original image for an adjacent viewpoint from the original image storage unit 10. The coding unit 31 determines a coding mode to be tested from coding modes stored in the coding mode/distortion amount storage unit 36. The coding unit 31 performs coding of the coding target block in the determined coding mode to obtain a coded block. The coding unit 31 outputs the coded block to the decoding unit 32. Also, the coding unit 31 outputs a coded block having a minimum distortion amount to the external device, the coded block being obtained by repetition of the above processing.

The decoding unit 32 acquires the coded block outputted from the coding unit 31. The decoding unit 32 performs decoding of the coded block to obtain a decoded block. The decoding unit 32 outputs the decoded block to the difference calculation unit 33. Also, the coding unit 31 outputs a decoded block having a minimum distortion amount to the external device, the decoded block being obtained by repetition of the above processing.

The difference calculation unit 33 acquires the information indicating the coding target block and the original image for the adjacent viewpoint from the original image storage unit 10. Also, the difference calculation unit 33 acquires a decoded image for the adjacent viewpoint from the decoded image storage unit 20. Also, the difference calculation unit 33 acquires a decoded block relating to the adjacent viewpoint, the decoded block being located at a position that is the same as a position of the coding target block on a screen, from the decoding unit 32.

Then, for each pixel, the difference calculation unit 33 calculates a difference value between a pixel value of the coded block in the original image for the adjacent viewpoint and a pixel value of a block at a position that is the same as a position of the coded block in the decoded image for the adjacent viewpoint and a difference value between the pixel value of the coded block in the original image for the adjacent viewpoint and a pixel value of the decoded block acquired from the decoding unit 32. The difference calculation unit 33 outputs the calculated difference values to the distortion amount calculation unit 34.

The distortion amount calculation unit 34 acquires the difference values outputted from the difference calculation unit 33. The distortion amount calculation unit 34 assigns the acquired difference values to an evaluation formula and calculates the formula to calculate a distortion amount. The distortion amount calculation unit 34 outputs a calculation result of a result of the calculation according to the evaluation formula to the distortion amount comparison unit 35.

The distortion amount comparison unit 35 acquires the calculation result outputted from the distortion amount calculation unit 34. The distortion amount comparison unit 35 causes the acquired calculation result to be stored in the coding mode/distortion amount storage unit 36. Also, the distortion amount comparison unit 35 acquires a minimum value of previous calculations results from the coding mode/distortion amount storage unit 36. The distortion amount comparison unit 35 compares the above calculation result and the minimum value of the previous calculation results.

If the above calculation result is smaller than the minimum value of the previous calculation results, the distortion amount comparison unit 35 updates a value of the minimum value stored in the coding mode/distortion amount storage unit 36 with the above calculation result. Also, if the above calculation result is smaller than the minimum value of the previous calculation results, the distortion amount comparison unit 35 updates a value of a variable indicating a coding mode in which the distortion amount becomes minimum, the value being stored in the coding mode/distortion amount storage unit 36, with a value indicating the coding mode determined by the coding unit 31.

The coding mode/distortion amount storage unit 36 stores the minimum value of the previous calculation results and the value of the variable indicating the coding mode in which the distortion amount becomes minimum. The coding mode/distortion amount storage unit 36 is provided by, for example, a flash memory, an HDD, an SDD, a RAM, a register or the like.

Figure 4:
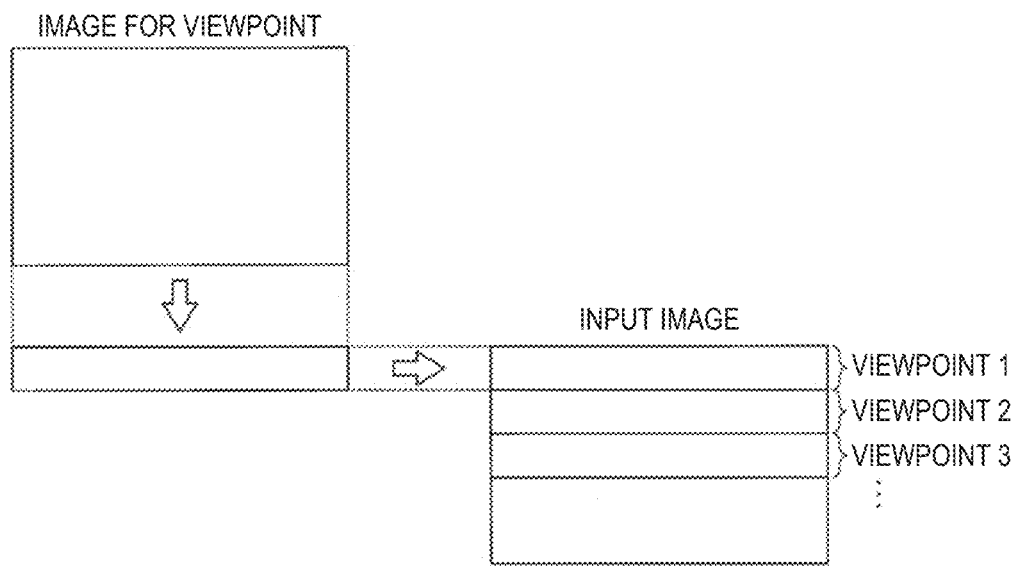
FIG. 4 is a diagram for describing a linearly blended input image.
Figure 5:
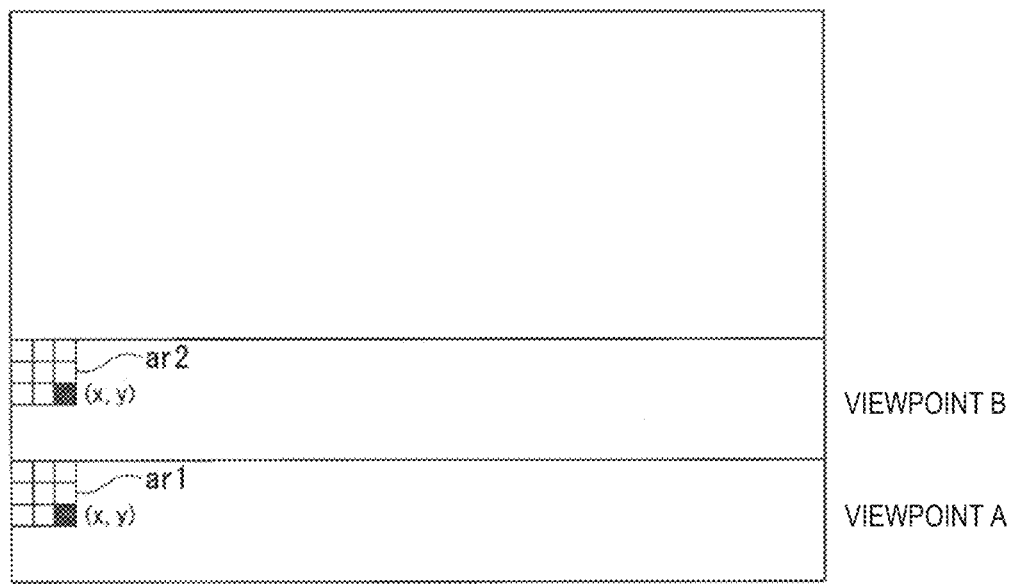
FIG. 5 is a diagram for describing a coding target block to be coded by the evaluation device 1 according to an embodiment of the present invention.
Figure 6:
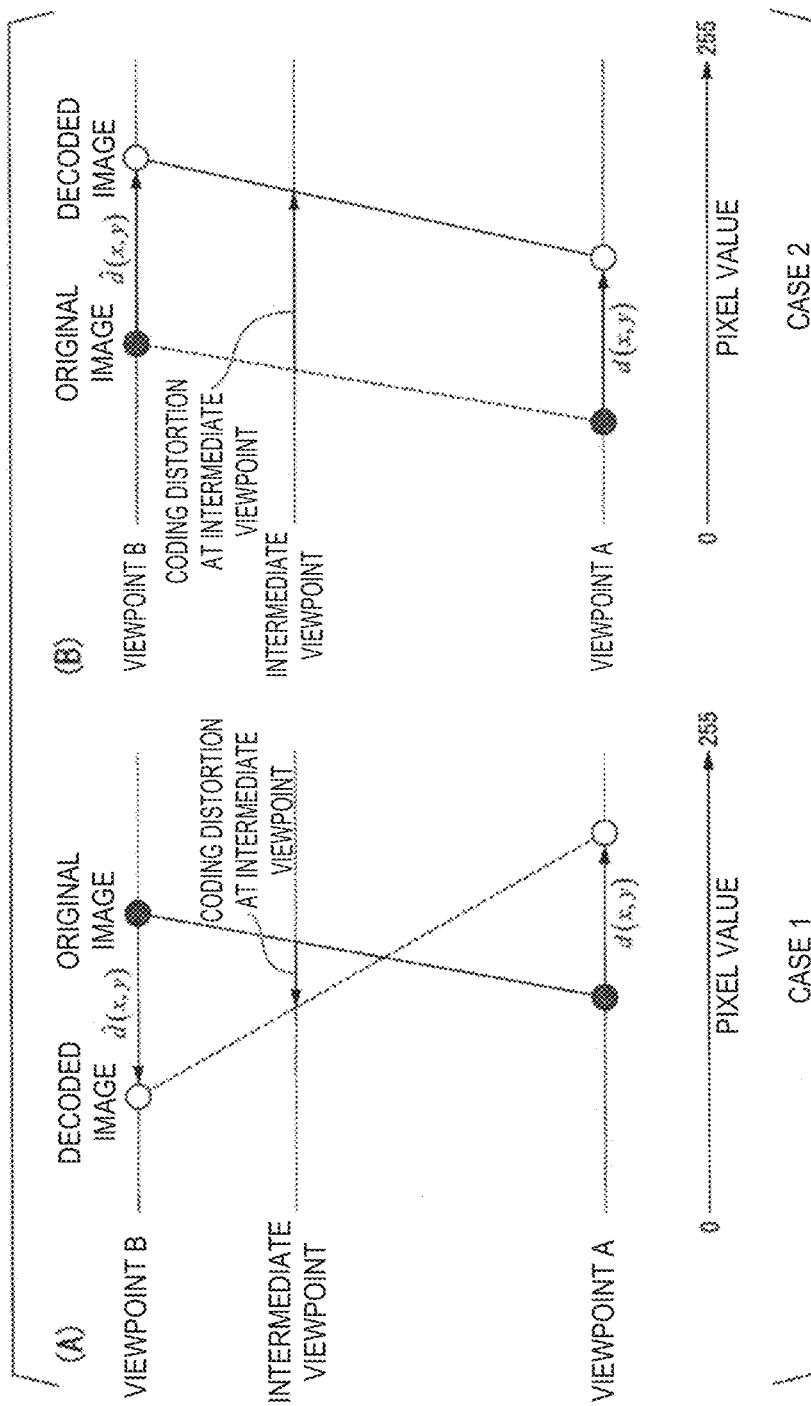
FIG. 6 includes diagrams for describing a coding distortion in an intermediate viewpoint image due to linear blending.
Figure 7:
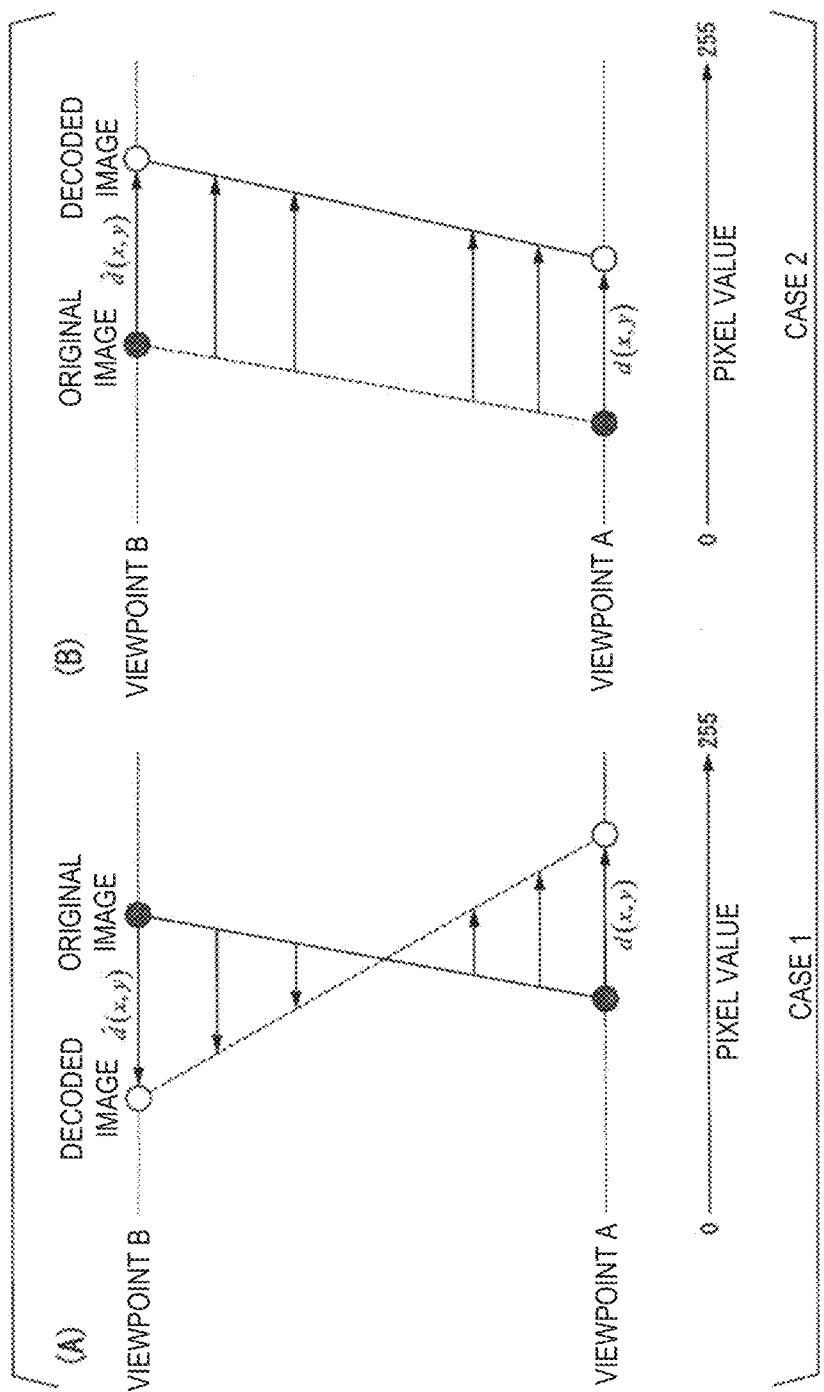
FIG. 7 includes diagrams for describing a coding distortion in an intermediate viewpoint image due to linear blending.

Note that as illustrated in FIG. 4, a linearly blended input viewpoint image to be inputted to the evaluation device 1 is an image resulting from images for a plurality of viewpoints being sub-sampled and then stacked vertically. Note that the original image for the adjacent viewpoint and the decoded image for the adjacent viewpoint to be inputted to the difference calculation unit 33 may be an area corresponding to a position that is the same as the position of the coding target block (partial image inside the original image and the decoded image) on the screen. For example, as illustrated in FIG. 5, where the coding target block is an image area ar1 of an image for viewpoint A, the original image for the adjacent viewpoint and the decoded image for the adjacent viewpoint to be inputted to the difference calculation unit 33 may be the part of an image area ar2 of an image for viewpoint B alone. Note that as illustrated in FIG. 5, the coded block is an aggregate of pixels each having coordinates (x, y).

Note that the coding target block needs to be selected from among images for viewpoints other than a first coded viewpoint in the input image (that is, other than viewpoint 1 in FIG. 4). This is because in the below-described evaluation procedure, evaluation of a coding target block is performed using an image for an adjacent viewpoint, the image being coded one image before an image for a viewpoint corresponding to the coding target block. Note that for an image for a viewpoint to be coded first, for example, it is only necessary to perform selection of a coding mode based on calculation of a square error such as that generally performed with H.265/HEVC.

[Operation of Coding Mode Selection Unit]

Operation of the coding mode selection unit 30 will be described below.

Figure 3:
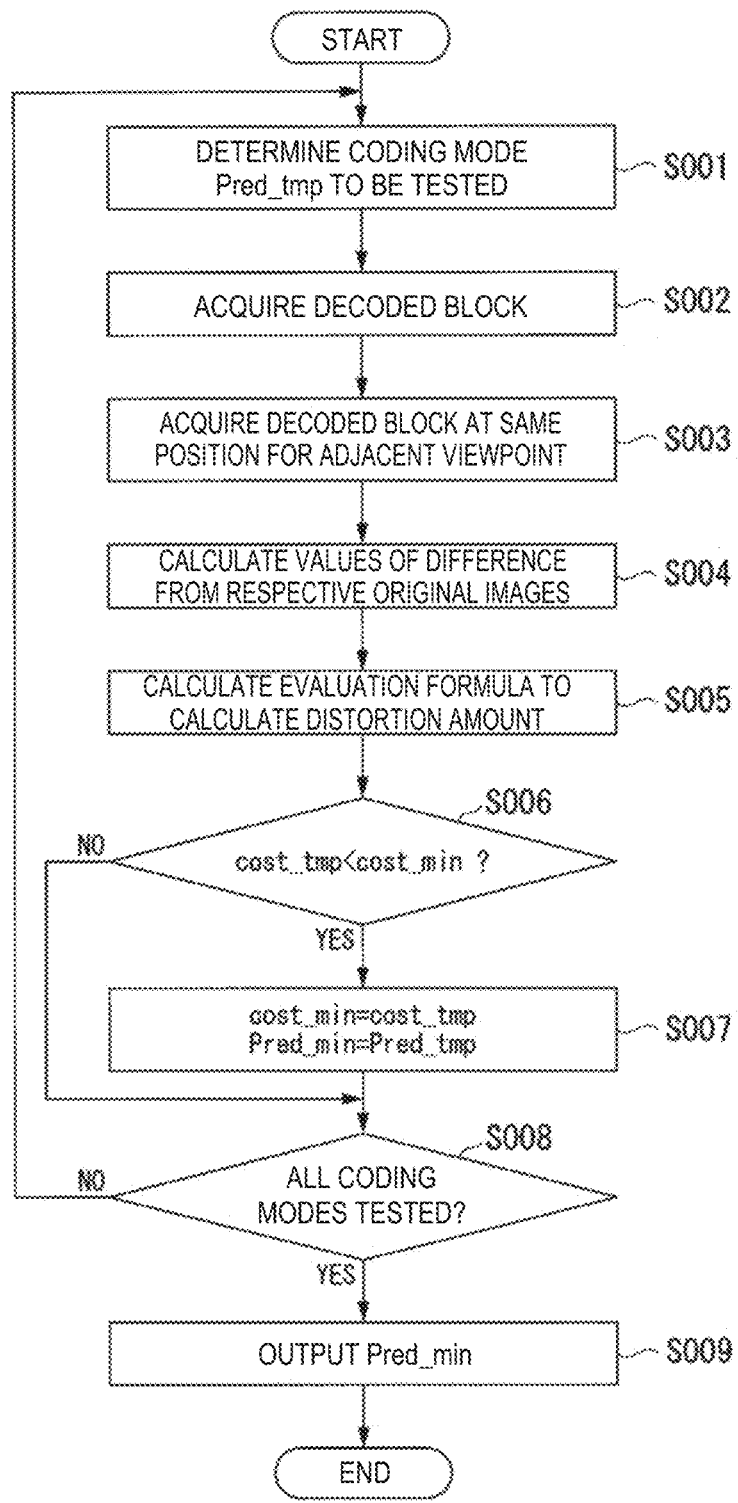
FIG. 3 is a flowchart illustrating operation of the coding mode selection unit 30 in the evaluation device 1 according to an embodiment of the present invention.

FIG. 3 is a flowchart illustrating operation of the coding mode selection unit 30 in the evaluation device 1 according to an embodiment of the present invention. Here, a case where coding of a coded block having a size in a horizontal direction of W and a size in a vertical direction of H is performed will be described. Note that each of W and H is, for example, the number of pixels.

The coding unit 31 acquires information indicating a coding target block and an original image for an adjacent viewpoint. The coding unit 31 determines a value of Pred_tmp, which is a variable indicating a coding mode to be newly tested (step S001) and then performs coding of the coding target block in the coding mode to obtain a coded block. The decoding unit 32 performs decoding of the coded block to obtain a decoded block (step S002).

The difference calculation unit 33 acquires the information indicating the coding target block and the original image for the adjacent viewpoint from the original image storage unit 10. Also, the difference calculation unit 33 acquires a decoded image for the adjacent viewpoint from the decoded image storage unit 20. Also, the difference calculation unit 33 acquires a decoded block relating to the adjacent viewpoint, the decoded block being located at a position that is the same as a position of the coding target block on the screen, from the decoding unit 32 (step S003). Then, for each pixel, the difference calculation unit 33 calculates a difference value between a pixel value of the original image and a pixel value of the decoded image and a difference value between the pixel value of the original image and a pixel value of the decoded block (step S004).

The distortion amount calculation unit 34 assigns the difference values calculated by the difference calculation unit 33 to Formula (2) below, which is an evaluation formula, and calculates Formula (2) to calculate a distortion amount (step S005).

[Math. 3]

$$SE_{LBD} = \sum_{x=0}^{W-1}\sum_{y=0}^{H-1} \left( d(x, y)^2 + \Lambda d(x, y)\hat{d}(x, y) + \hat{d}(x, y)^2 \right) \quad (2)$$

where $\Lambda \in [-2, 1]$

Here, W and H represent the number of pixels in the horizontal direction and the number of pixels in the vertical direction, respectively, in an original image for the first viewpoint. Also, d(x, y) represents a difference value between a pixel value of coordinates (x, y) in the original image for the first viewpoint and a pixel value of coordinates (x, y) in a decoded image for the first viewpoint, and d^(x, y) represents a difference value between a pixel value of coordinates (x, y) in an original image for the second viewpoint and a pixel value of coordinates (x, y) in a decoded image for the second viewpoint.

Here, where $\Lambda=1$, Formula (2) is a coding distortion evaluation formula from the perspective of outputting an image close to an original image. Also, where $\Lambda=-2$, Formula (2) is a coding distortion evaluation formula from the perspective of change in pixel value when the viewpoint is moved being displayed in an originally intended manner, that is, in a manner that is similar to that of a case where no coding is performed. Note that display in a manner that is similar to that of a case where no coding is performed is display that is substantially similar to display in a case where an image for an intermediate viewpoint is generated using original images.

The distortion amount comparison unit 35 causes a calculation result of calculation by the distortion amount calculation unit 34 to be stored in the coding mode/distortion amount storage unit 36 as a value of cost_tmp, which is a temporary variable. Then, the distortion amount comparison unit 35 compares cost_tmp and cost_min, which is a minimum value of previous results of calculation of Formula (2) (step S006).

If cost_tmp is smaller than cost_min, the distortion amount comparison unit 35 updates the value of cost_min stored in the coding mode/distortion amount storage unit 36 with the value of cost_tmp. Also, if cost_tmp is smaller than cost_min, the distortion amount comparison unit 35 updates a value of Pred_min, which is a variable indicating a coding mode in which the distortion amount becomes minimum, the value being stored in the coding mode/distortion amount storage unit 36, with the value of Pred_tmp above (step S007).

The coding mode selection unit 30 determines whether or not all of the coding modes have been tested (step S008). If all of the coding modes have been tested, the coding mode selection unit 30 outputs the value of Pred_min (step S009) and terminates the operation illustrated in the flowchart in FIG. 3. On the other hand, if there is a coding mode not yet tested, the coding mode selection unit 30 repeats processing that is similar to the above using the coding mode not yet tested (return to step S001).

Other Embodiments

Note that although the above embodiment has been described in terms of a coding distortion evaluation method for an image on a linear blending display, where the value of $\Lambda$ in Formula (2) is set to be a negative value, this evaluation method can be used for coding distortion evaluation of a general multi-viewpoint image.

In a general multi-viewpoint image, no intermediate viewpoint is generated in multi-viewpoint display using screen switching and stereoscopic display in which different video images are outputted to right and left eyes. Therefore, there is no need to consider case 1 in the above-stated problem. On the other hand, case 2 in the above-stated problem means consistency of a coding distortion in an adjacent viewpoint, and thus, may affect subjective image quality. Therefore, subjective image quality can be enhanced by setting the value of A to a negative value to consider a correlation with the coding distortion in the adjacent viewpoint.

Note that in the above-described embodiment, in selection of a coding mode, the evaluation formula in Formula (2) is used as a replacement for a square error. Besides, image quality evaluation can also be performed by, for example, calculating an evaluation value of an entirety of an image as follows. First, a square error of a pixel value between an image for a viewpoint to be coded first and an image for a viewpoint to be coded last is calculated. Next, the evaluation formula in Formula (2) is calculated for the entirety of the image except the image for the viewpoint to be coded first. Then, results of these two calculations are added up. Here, where Wo is a size in a horizontal direction of an image for each viewpoint, Ho is a size in a vertical direction of the same and n is the number of viewpoints, a coding distortion evaluation formula is represented by Formula (3) below:

[Math. 4]

$$SE_{LBD} = \sum_{x=0}^{W_0-1}\sum_{y=0}^{H_0-1} d(x,y)^2 + \sum_{x=0}^{W_0-1}\sum_{y=H_0}^{nH_0-1}\left(d(x,y)^2 + \Lambda d(x,y)\hat{d}(x,y) + \hat{d}(x,y)^2\right) + \sum_{x=0}^{W_0-1}\sum_{y=(n-1)H_0}^{nH_0-1} d(x,y)^2 = 2\sum_{x=0}^{W_0-1}\sum_{y=0}^{nH_0-1} d(x,y)^2 + \sum_{x=0}^{W_0-1}\sum_{y=H_0}^{nH_0-1} \Lambda d(x,y)\hat{d}(x,y) \quad (3)$$

where $\Lambda \in [-2, 1]$

Next, Formula (4) below in which an MSE (mean squared error) is extended is obtained by further dividing the evaluation formula in Formula (3) above by the number of pixels of an image and 2 in order to eliminate dependency on resolution. As a value of $MSE_{LBD}$ indicated below is smaller, further enhancement in subjective image quality is expected.

[Math. 5]

$$MSE_{LBD} = \frac{1}{nW_0H_0}\left(\sum_{x=0}^{W_0-1}\sum_{y=0}^{nH_0-1} d(x,y)^2 + \sum_{x=0}^{W_0-1}\sum_{y=H_0}^{nH_0-1} \Lambda' d(x,y)\hat{d}(x,y)\right) \quad (4)$$

where $\Lambda' \in \left[-1, \frac{1}{2}\right]$

Furthermore, Formula (5) below for an existing PSNR (peak signal-to-noise ratio) can be obtained by scaling Formula (4) above using a signal value that is a peak in order to eliminate dependency on gradation of pixel values, and consequently, Formula (6) below can be obtained. As a value of $PSNR_{LBD}$ indicated below is larger, further enhancement in subjective image quality is expected.

[Math. 6]

$$PSNR_{LBD} = 10\log_{10}\frac{255^2\frac{n+(n-1)\Lambda'}{n}}{MSE_{LBD}} \quad \text{where } \Lambda' \in \left[0, \frac{1}{2}\right] \quad (5)$$

-continued

[Math. 7]

$$PSNR_{LBD} = 10\log_{10}\frac{255^2\frac{n-(n-1)\Lambda'}{n}}{MSE_{LBD}} \quad \text{where } \Lambda' \in [-1, 0] \quad (6)$$

The above embodiment has been described in terms of an evaluation method in which an image is evaluated using results of coding being performed to the last. However, where an evaluation method according to the present invention is used, for example, as an index for determining a coding parameter, instead of (images resulting from decoding) coded images, for example, tentative evaluation requiring a smaller amount of arithmetic operation may be performed using transformed values that are results of a Hadamard transform being performed.

As described above, the evaluation device 1 according to embodiments of the present invention is an evaluation device for evaluating coding quality of coded data of an image for a particular viewpoint (first viewpoint) in an input viewpoint image (multi-viewpoint image). The evaluation device 1 includes the coding mode selection unit 30 (evaluation unit) that evaluates coding quality of coded data relating to an image for the first viewpoint by associating a pixel value of an original image for the first viewpoint, a pixel value obtained from the coded data relating to the image for the first viewpoint, a pixel value of an original image for a second viewpoint that is different from the first viewpoint and a pixel value obtained from coded data relating to an image for the second viewpoint with one another.

As a result of including the above configuration, the evaluation device 1 according to embodiments of the present invention can select a coding mode based on an evaluation value of a coding distortion. Consequently, while in the conventional coding distortion evaluation scale, subjective image quality of differences displayed on a linear blending display is not sufficiently reflected, the evaluation device 1 can enhance subjective image quality of an entirety of an image displayed on a linear blending display, that is, input viewpoint images and intermediate viewpoint images in a manner suitable for a viewing style or a content.

A part or an entirety of the evaluation device 1 in the above-described embodiments may be implemented by a computer. In such case, the part or the entirety of the evaluation device 1 may be implemented by recording a program for implementing functions of the evaluation device 1 on a computer-readable recording medium and causing a computer system to read and execute the program recorded on the recording medium. Note that the "computer system" mentioned here includes an OS and hardware pieces such as peripheral devices. Also, the "computer-readable recording medium" refers to a portable medium such as a flexible disk, a magnetooptical disk, a ROM or a CD-ROM or a storage device such as a hard disk incorporated in the computer system. Furthermore, the "computer-readable recording medium" may include one that dynamically holds a program for a short period of time like a communication wire in a case where a program is transmitted via a network such as the Internet or a communication channel such as a telephone line and one that holds the program for a certain period of time like a volatile memory inside a computer system that serves as a server or a client in such case. Also, the program may be one intended to implement some of the above functions, may be one that can provide the aforementioned functions in combination with the program already recorded in the computer system or may be implemented using hardware pieces such as a PLD (programmable logic device) or an FPGA (field programmable gate array).

Although embodiments of the present invention have been described above with reference to the drawings, the above embodiments are mere examples of the present invention and it is clear that the present invention is not limited to the above embodiments. Therefore, addition, omission, replacement and other changes of components are possible without departing from the technical idea and spirit of the present invention.

REFERENCE SIGNS LIST 1 evaluation device
10 original image storage unit
20 decoded image storage unit
30 coding mode selection unit
31 coding unit
32 decoding unit
33 difference calculation unit
34 distortion amount calculation unit
35 distortion amount comparison unit
36 coding mode/distortion amount storage unit

The invention claimed is:

1. An evaluation device for evaluating coding quality of coded data of an image for a first viewpoint in a multi-viewpoint image, the evaluation device comprising:
a processor; and
a storage medium having computer program instructions stored thereon, when executed by the processor, perform to:
evaluate coding quality of coded data relating to the first viewpoint on a pixel-by-pixel basis using a difference value between a pixel value in an original image for the first viewpoint and a corresponding pixel value in the coded data for the first viewpoint, and a difference value between pixel value in the original image for a second viewpoint that is different from the first viewpoint and a corresponding pixel value in the coded data for the second viewpoint;
reflect evaluation relating to a third viewpoint that is different from the first viewpoint and the second viewpoint and is not included in images included in the multi-viewpoint image, in the evaluation of the coding quality of the coded data relating to the first viewpoint, by using the pixel value of the original image for the second viewpoint and the pixel value obtained from the coded data relating to the second viewpoint, wherein the third viewpoint is an arbitrary viewpoint included in an aggregate of viewpoints located between the first viewpoint and the second viewpoint; and
evaluate coding quality of the coded data relating to the first viewpoint, using amounts of change of at least two pixel values of the pixel value of the original image for the first viewpoint, the pixel value of the original image for the second viewpoint, and a pixel value of an image for the third viewpoint that is based on the original image for the first viewpoint and the original image for the second viewpoint and amounts of change of at least two pixel values of the pixel value obtained from the coded data relating to the first viewpoint, the pixel value obtained from the coded data relating to the second viewpoint, and a pixel value of an image for the third viewpoint, the pixel value being obtained based on the pixel value obtained from the coded data relating to the first viewpoint and the pixel value obtained from the coded data relating to the second viewpoint.

2. The evaluation device according to claim 1, wherein the computer program instructions further perform to evaluate coding quality of the coded data relating to the first viewpoint, using a difference value between a pixel value of an image for the third viewpoint based on the original image for the first viewpoint and the original image for the second viewpoint and a pixel value of an image for the third viewpoint based on the pixel value obtained from the coded data relating to the first viewpoint and the pixel value obtained from the coded data relating to the second viewpoint.

3. The evaluation device according to claim 1, wherein the computer program instructions further perform to evaluate coding quality of the coded data relating to the first viewpoint, using an amount of difference between the pixel values of the images for the third viewpoint.

4. The evaluation device according to claim 2, wherein the computer program instructions further perform to evaluate coding quality of the coded data relating to the first viewpoint, using a value of $SE_{LBD}$ calculated according to the following evaluation formula:

[Math. 1]

$$SE_{LBD} = \sum_{x=0}^{w-1}\sum_{y=0}^{H-1}\left(d(x, y)^2 + \Lambda d(x, y)\hat{d}(x, y) + \hat{d}(x, y)^2\right)$$

where $\Lambda \in [-2, 1]$ where W and H represent a number of pixels in a horizontal direction and a number of pixels in a vertical direction in the original image for the first viewpoint, respectively, and d(x, y) represents a difference value between a pixel value in the original image for the first viewpoint and a pixel value in a decoded image for the first viewpoint and d^(x,y) represents a difference value between a pixel value in the original image for the second viewpoint and a pixel value in a decoded image for the second viewpoint.

5. An evaluation method for evaluating coding quality of coded data of an image for a first viewpoint in a multi-viewpoint image, the evaluation method comprising:
an evaluation step of evaluating coding quality of coded data relating to the first viewpoint on a pixel-by-pixel basis using a difference value between a pixel value in an original image for the first viewpoint and a corresponding pixel value in the coded data for the first viewpoint, and a difference value between pixel value in the original image for a second viewpoint that is different from the first viewpoint and a corresponding pixel value in the coded data for the second viewpoint;
reflecting evaluation relating to a third viewpoint that is different from the first viewpoint and the second viewpoint and is not included in images included in the multi-viewpoint image, in the evaluation of the coding quality of the coded data relating to the first viewpoint, by using the pixel value of the original image for the second viewpoint and the pixel value obtained from the coded data relating to the second viewpoint, wherein the third viewpoint is an arbitrary viewpoint included in an aggregate of viewpoints located between the first viewpoint and the second viewpoint; and further evaluating coding quality of the coded data relating to the first viewpoint, using amounts of change of at least two pixel values of the pixel value of the original image for the first viewpoint, the pixel value of the original image for the second viewpoint, and a pixel value of an image for the third viewpoint that is based on the original image for the first viewpoint and the original image for the second viewpoint and amounts of change of at least two pixel values of the pixel value obtained from the coded data relating to the first viewpoint, the pixel value obtained from the coded data relating to the second viewpoint, and a pixel value of an image for the third viewpoint, the pixel value being obtained based on the pixel value obtained from the coded data relating to the first viewpoint and the pixel value obtained from the coded data relating to the second viewpoint.

6. The evaluation method according to claim 5, wherein further evaluates coding quality of the coded data relating to the first viewpoint, using a difference value between a pixel value of an image for the third viewpoint based on the original image for the first viewpoint and the original image for the second viewpoint and a pixel value of an image for the third viewpoint based on the pixel value obtained from the coded data relating to the first viewpoint and the pixel value obtained from the coded data relating to the second viewpoint.

7. The evaluation method according to claim 5, further evaluates coding quality of the coded data relating to the first viewpoint, using an amount of difference between the pixel values of the images for the third viewpoint.

8. The evaluation method according to claim 5, further evaluates coding quality of the coded data relating to the first viewpoint, using a value of $SE_{LBD}$ calculated according to the following evaluation formula:

[Math. 1]

$$SE_{LBD} = \sum_{x=0}^{w-1}\sum_{y=0}^{H-1} \left(d(x, y)^2 + \Lambda d(x, y)\hat{d}(x, y) + \hat{d}(x, y)^2\right)$$

where $\Lambda \epsilon [-2, 1]$ where W and H represent a number of pixels in a horizontal direction and a number of pixels in a vertical direction in the original image for the first viewpoint, respectively, and d(x, y) represents a difference value between a pixel value in the original image for the first viewpoint and a pixel value in a decoded image for the first viewpoint and d^(x, y) represents a difference value between a pixel value in the original image for the second viewpoint and a pixel value in a decoded image for the second viewpoint.

9. An evaluation device for evaluating coding quality of coded data of an image for a first viewpoint in a multi-viewpoint image, the evaluation device comprising:
a processor; and
a storage medium having computer program instructions stored thereon, when executed by the processor, perform to:
evaluate coding quality of coded data relating to the first viewpoint on a pixel-by-pixel basis using a difference value between a pixel value in an original image for the first viewpoint and a corresponding pixel value in the coded data for the first viewpoint, and a difference value between pixel value in the original image for a second viewpoint that is different from the first viewpoint and a corresponding pixel value in the coded data for the second viewpoint;
reflect evaluation relating to a third viewpoint that is different from the first viewpoint and the second viewpoint and is not included in images included in the multi-viewpoint image, in the evaluation of the coding quality of the coded data relating to the first viewpoint, by using the pixel value of the original image for the second viewpoint and the pixel value obtained from the coded data relating to the second viewpoint, wherein the third viewpoint is an arbitrary viewpoint included in an aggregate of viewpoints located between the first viewpoint and the second viewpoint;
evaluate coding quality of the coded data relating to the first viewpoint, using a difference value between a pixel value of an image for the third viewpoint based on the original image for the first viewpoint and the original image for the second viewpoint and a pixel value of an image for the third viewpoint based on the pixel value obtained from the coded data relating to the first viewpoint and the pixel value obtained from the coded data relating to the second viewpoint; and
evaluate coding quality of the coded data relating to the first viewpoint, using a value of $SE_{LBD}$ calculated according to the following evaluation formula:

[Math. 1]

$$SE_{LBD} = \sum_{x=0}^{w-1}\sum_{y=0}^{H-1} \left(d(x, y)^2 + \Lambda d(x, y)\hat{d}(x, y) + \hat{d}(x, y)^2\right)$$

where $\Lambda \epsilon [-2, 1]$ where W and H represent a number of pixels in a horizontal direction and a number of pixels in a vertical direction in the original image for the first viewpoint, respectively, and d(x, y) represents a difference value between a pixel value in the original image for the first viewpoint and a pixel value in a decoded image for the first viewpoint and d^(x,y) represents a difference value between a pixel value in the original image for the second viewpoint and a pixel value in a decoded image for the second viewpoint.

* * * * *